July 19, 1960  A. FOSDAL  2,945,496
DENTAL INSTRUMENT FOR IMMOBILIZING TISSUE
Filed Aug. 18, 1958
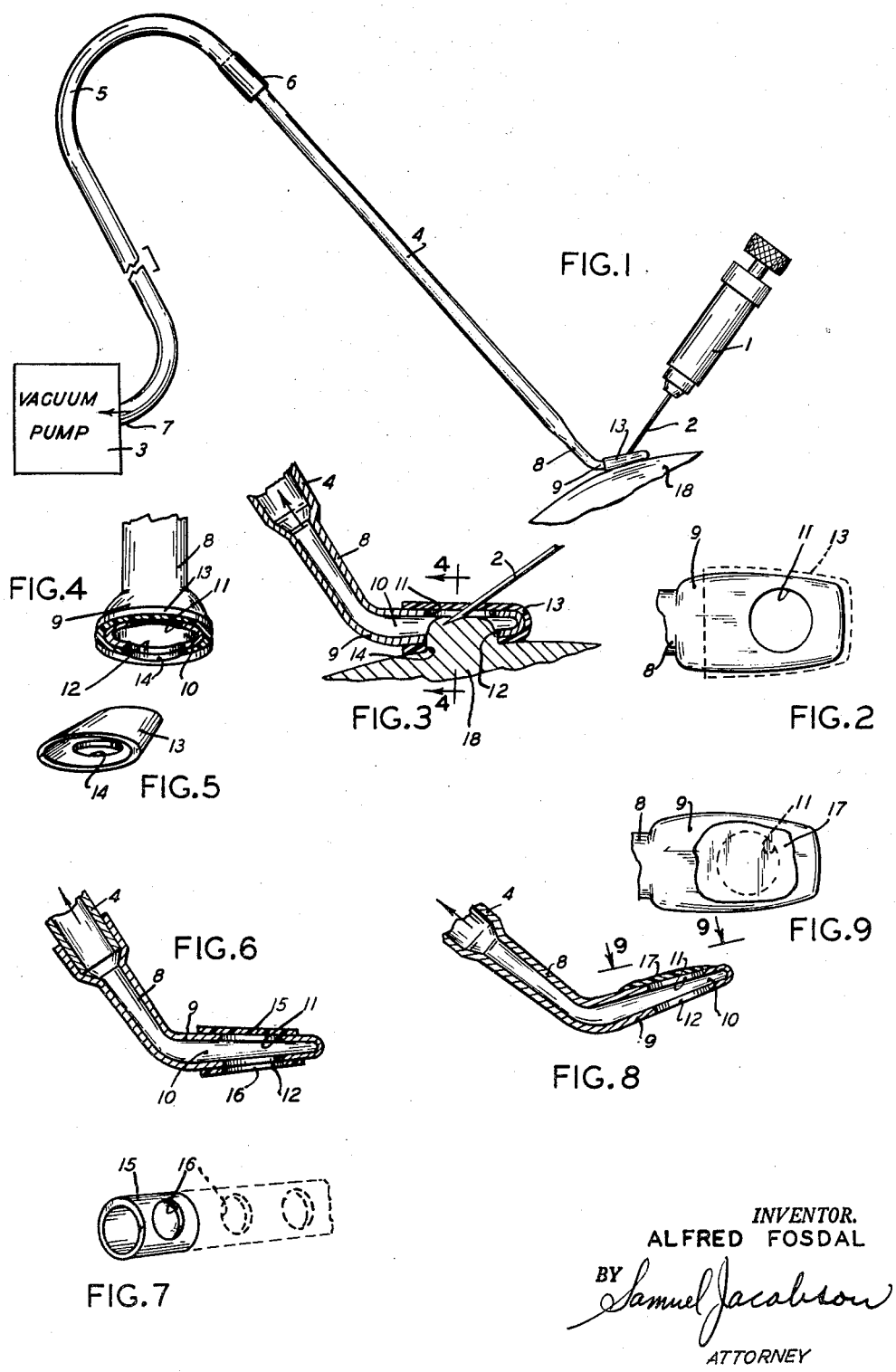
INVENTOR.
ALFRED FOSDAL
BY Samuel Jacobson
ATTORNEY

United States Patent Office 2,945,496
Patented July 19, 1960

2,945,496

DENTAL INSTRUMENT FOR IMMOBILIZING TISSUE

Alfred Fosdal, Rte. 4, Box 398, Medford, Oreg.

Filed Aug. 18, 1958, Ser. No. 755,808

7 Claims. (Cl. 128—297)

It has long been recognized by the medical and dental professions that the threshold of pain varies with each individual and, because of psychological factors, this pain threshold is usually lowered when a patient is confronted with a hypodermic syringe. While pain relieving drugs administered through the hypodermic syringe have minimized pain, considerable pain and discomfort is suffered by a patient during the insertion of such drugs into the tissue via the needle of the syringe.

It is within the contemplation of my invention to provide a dental instrument which definitely minimizes and in some instances completely eliminates the pain normally induced during the initial insertion of the hypodermic needle into the tissue.

The principal object of my invention is to provide a dental instrument which preconditions the area into which the needle of a hypodermic syringe is to penetrate in order to minimize the shock to the patient when a hypodermic needle punctures the tissue.

A further object of my invention is to provide a dental instrument, the tip or foot of which holds the gum tissue to be punctured by the needle of a hypodermic syringe in a firm and immovable position by the application of negative atmospheric pressure.

Another object of my invention is to provide a dental instrument adapted for masking and minimizing the entry pain of a hypodermic needle into the gum tissue of the mouth under sterile conditions.

A still further object of my invention is to provide a dental instrument which is sturdy but light in weight; compact and inexpensive but easy to manipulate and apply.

A full and complete understanding of my invention and other objects, advantages and novel characteristics thereof will become apparent and readily understood from the following detailed description which must be read in connection with the disclosures in the accompanying drawing forming a part hereof, and in which:

Fig. 1 is an elevational view of the dental instrument embodying my invention shown connected to a suction facility and showing a fancifully disclosed hypodermic syringe and needle in position for penetration through the instrument and into the tissue;

Fig. 2 is a fragmentary top plan view of the tip or foot of the dental instrument embodying the preferred form of my invention showing the transparent sleeve or jacket in position;

Fig. 3 is a fragmentary section of the dental instrument embodying the preferred form of my invention graphically illustrating the position of its jacketed tip or foot upon the gum tissue and the penetration of a hypodermic needle through the jacket and into the gum tissue;

Fig. 4 is a fragmentary section of the preferred embodiment of my invention taken on line 4—4 of Fig. 3 looking in the direction indicated showing some of the structural characteristics of the invention;

Fig. 5 is a perspective view of the preferred embodiment of the transparent jacket fitted upon the tip or foot of the dental instrument embodying the principles of my invention;

Fig. 6 is a fragmentary section of the dental instrument embodying the principles of my invention showing a modified form of jacket in the form of a sleeve fitting over the tip or foot of the instrument;

Fig. 7 is a perspective view illustrating a transparent plastic tube which can be readily severed to form sleeves for covering the tip or foot of the dental instrument;

Fig. 8 is also a fragmentary section of the dental instrument embodying the principles of my invention but illustrating a modified form of transparent cover for the top of the tip or foot; and Fig. 9 is a fragmentary top plan view taken on line 9—9 of Fig. 8 looking in the direction indicated showing the relative position of the transparent plastic in relation to the tip or foot of the dental instrument.

In Fig. 1 is shown a hypodermic syringe 1 of the type well-known to the medical and dental arts which has a plunger slidably movable in its cylinder, a nozzle removably secured to the forward end of the cylinder and a hypodermic needle 2 securely mounted in the nozzle and in direct communication with the interior of the cylinder. Also shown in Fig. 1, by way of representation only is a pump facility 3 of any desirable type capable of creating the desired negative atmospheric pressure within the dental instrument embodying the principles of the invention when employed in the manner hereinafter to be explained.

The invention consists of a hollow handle 4 whose peripheral contour may be of any desirable shape, such as tubular or ovoid and it may be made of any material possessing inherent rigidity, such as metal or plastic. A pliable tube 5 of sufficient length and formed of any desirable material, such as rubber or plastic, is snugly secured to one end of handle 4, as shown at 6, and has its other end 7 secured to vacuum pump 3 in any well-known manner.

Handle 4 is slightly flattened at its other end, as shown at 8, and a hollow tip or foot 9 is either removably joined thereto, as shown in Fig. 6 or is made an integral part thereof, as shown in Fig. 1. Tip or foot 9 extends at an angle to handle 4 and has its interior in direct communication with the interior of the handle. The top and bottom of tip or foot 9 is flattened to form an ovoid interior 10, as shown in Figs. 3 and 4 and its sides are tapered, as graphically shown in Fig. 2. The angle assumed by tip or foot 9 in relation to handle 4 is such as not to interfere with the dentist's vision but still permit the bottom flat surface to contour the gum tissue into which the hypodermic needle 2 is to be projected. A pair of openings 11 and 12, having identical diameters, are formed through the top and bottom surfaces of tip or foot 9 and are positioned in direct spaced alignment with each other.

As shown in Fig. 5, a transparent jacket 13, ovoid in its peripheral contour and possessing a taper corresponding to the taper of tip or foot 9, has an opening 14, the circumference of which is substantially identical to the circumference of either of the openings 11 and 12 formed in tip or foot 9. Jacket 13 has one of its ends open and the other closed and is snugly fitted upon tip or foot 9 so that opening 14 coincides with opening 12 of the foot and, except for opening 14, a tight seal is formed between the interior of the jacket 13 and the exterior of the tip or foot 9, the top opening 11 of foot 9 being completely covered and adequately sealed against leakage. Jacket 13 may be made of any thin transparent material which is impervious to chemicals and all types of liquids and which may be, if desired, self-sealing and disposable. Whatever material is employed, it is most essential that it is capable of easy penetration by the hypodermic needle 2 without measurably effecting the vacuum within the interiors of the foot and handle on penetration. Such material may be made of a plastic or some other material having the foregoing characteristics. If it is contemplated to re-use the jacket 13 then, of course, it is essential that the jacket not only be impervious to chemicals and liquids and have self-sealing qualities, but it must withstand hot or cold sterilization.

As shown in Fig. 6 a clear elastic sleeve 15, having essentially the same characteristics as jacket 13 except that both ends are open, may be employed in lieu of jacket 13 and it, too, has an opening 16 therein which, when the sleeve is snugly fitted upon the tip or foot 9, coincides with opening 12 therein. These sleeves 15 may be fabricated as shown in Fig. 7 and portions thereof snipped off to provide the desired sized sleeve.

A modified form for sealing the top opening 11 of foot 9 is revealed in Figs. 8 and 9 which show a transparent substance 17 sealing off opening 11. This substance may be made of any material, such as a transparent plastic or may be in the form of a liquid which hardens on contact with the atmosphere, such as a flexible collodion, or even made of a substance similar to the product known as "Scotch tape."

When jacket, sleeve, or other appropriately sealed material is placed upon opening 11 of foot 9, the only available opening to the interior of handle 4 and foot 9 is opening 12 and when this opening is placed upon the tissue to precondition it for the insertion therein of the hypodermic needle 2, it too is sealed and, as the vacuum facility operates, a vacuum is created within the interiors of the foot 9 and handle 4 by the suction pump 3 so that the gum tissue 18 upon which opening 12 rests is drawn into the opening and thereby tightened as graphically shown in Fig. 3.

In practice the dental instrument embodying the invention is manipulated so that the bottom opening of the foot is placed upon the tissue at the site where the injection is to be made with just enough pressure applied to seal off the area to be punctured. The encompassed tissue is then drawn into the interior of the foot by the suction created therein as the vacuum pump operates. This causes the tissue to become taut, firm and immobile and thereby preconditioned to the insertion therein of the hypodermic needle 2. The needle, inserted at an angle, perforates the jacket, sleeve or other covering of the top opening in the foot and just penetrates the surface of the preconditioned tissue and, because of the immobility and firmness of the tissue, the patient feels no appreciable pain as the needle progressively feeds the pain killing drug into the fleshy tissue deadening it as the pain killing drug enters the tissue thorugh the needle.

As various changes are possible in the preferred and modified embodiments of the invention above set forth, it is to be understood that all matter herein set forth or shown in the accompanying drawings is to be interpreted as illustrative of the invention, and not in a limiting sense, but any permissible change must fall within the purview of the following claims, in which I claim as new and desire to secure by Letters Patent:

1. A dental instrument adapted to firmly hold body tissue taut and immovable at the site of a prospective hypodermic needle injection in order to minimize the pain of entry of said hypodermic needle, said instrument comprising a hollow body forming the handle of said instrument, a hollow foot removably secured to one end of said hollow body and in communication therewith, said foot having an opening through its upper wall and a like opening through its lower wall in direct alignment with each other, a transparent cover disposed upon the upper wall of said hollow foot over and immediately adjacent to the opening in the upper wall of said foot adapted to form a seal therefor, a hollow conduit secured to the opposite end of the hollow body and a vacuum pump secured to the other end of said conduit adapted to create negative atmospheric pressure within the interior of said hollow body and of said foot, when the opening in the lower wall of said foot is placed upon the tissue selected as the point of injection of said hypodermic needle and which acts as a seal therefor and thereby permitting the creation of a partial vacuum within said hollow body and foot causing said tissue to be drawn inwardly and held taut and immovable therein.

2. A dental instrument adapted to firmly hold body tissue taut and immovable at the site of a prospective hypodermic needle injection in order to minimize the pain of entry of said hypodermic needle, said instrument comprising a hollow body forming the handle of said instrument, a tapered hollow foot removably secured angularly to one end of said hollow body and in communication therewith, said foot having a pair of opposed openings in its upper and lower walls, a transparent self-sealing cover disposed upon the upper wall of said hollow foot over and immediately adjacent to the opening in said wall to form a seal therefor, and means secured to the opposite end of the hollow body for creating negative atmospheric pressure within its interior and the interior of said foot, when the opening in the lower wall of said foot is placed upon the tissue selected as the point for injection of said hypodermic needle and which acts as a seal therefor and thereby permitting the creation of a partial vacuum within said hollow body and foot causing said tissue to be drawn inwardly and held taut and immovable therein.

3. A dental instrument adapted to firmly hold body tissue taut and immovable at the site of a prospective hypodermic needle injection in order to minimize the pain of entry of said hypodermic needle, said instrument comprising a hollow body forming the handle of said instrument, a flatwise hollow foot formed integrally at one end of said hollow body and in communication therewith, said hollow body flattened to the same degree as said foot at the end thereof, said foot having a pair of opposed openings disposed in its upper and lower walls, means removably disposed upon the upper wall of said foot over and immediately adjacent to the opening in said wall to form a seal therefor, a suction pump, and a tube connecting said pump to the hollow body said pump adapted for creating negative atmospheric pressure within the interior of the hollow body and foot, when the opening in the lower wall of said foot is placed upon the tissue selected as the point for injection of said hypodermic needle and which acts as a seal therefor and thereby permitting the creation of a partial vacuum within said hollow body and foot causing said tissue to be drawn inwardly and held taut and immovable therein.

4. A dental instrument adapted to firmly hold body tissue taut and immovable at the site of a prospective hypodermic needle injection in order to minimize the pain of entry of said hypodermic needle, said instrument comprising an elongated tubular body forming the handle of said instrument, a flatwise hollow foot angularly connected to one end of said tubular body and in communication therewith, said tubular body being flattened to the same degree as said foot at its juncture therewith, said foot having a pair of opposed openings in its upper and lower walls, a self-sealing cover disposed upon the upper wall of said hollow foot over and immediately adjacent to the opening in said wall to form a seal therefor, and means secured to the opposite end of the tubular body for creating negative atmospheric pressure within its interior and the interior of said foot, when the opening in the lower wall of said foot is placed upon the tissue selected as the point for injection of said hypodermic needle and which acts as a seal therefor and thereby permitting the creation of a partial vacuum within said tubular body and foot causing said tissue to be drawn inwardly and held taut and immovable therein.

5. A dental instrument adapted to firmly hold body tissue taut and immovable at the site of a prospective hypodermic needle injection in order to minimize the pain of entry of said hypodermic needle, to be used in combination with a hypodermic needle, said instrument comprising an elongated tubular body forming the handle of said instrument, a flatwise hollow foot angularly connected to said tubular body and in communication therewith, said tubular body being flattened to the same degree as said foot at its juncture therewith, said foot having a pair of opposed openings in its upper and lower walls, and a self-sealing cover disposed upon the upper wall of said foot over and immediately adjacent to the opening in said wall to form a seal therefor.

6. A dental instrument adapted to firmly hold body tissue taut and immovable at the site of a prospective hypodermic needle injection in order to minimize the pain of entry of said hypodermic needle, to be used in combination with a hypodermic needle, said instrument comprising an elongated tubular body forming the handle of said instrument, a tapered flatwise hollow foot angularly connected to one end of said tubular body and in communication therewith, said tubular body being flattened to the same degree as said foot at its juncture therewith, said foot having a pair of opposed openings in its upper and lower walls, self-sealing means disposed upon the upper wall of said foot over and immediately adjacent to the opening in said wall to form a seal therefor, and means secured to the opposite end of the tubular body for creating negative atmospheric pressure within its interior and the interior of said foot, when the opening in the lower wall of said foot is placed upon the tissue selected as the point for injection of said hypodermic needle and which acts as a seal therefor and thereby permitting the creation of a partial vacuum within said tubular body and foot causing said tissue to be drawn inwardly and held taut and immovable therein.

7. In combination, a dental instrument adopted to firmly hold body tissue taut and immovable at the site of a prospective hypodermic needle injection in order to minimize the pain of entry of said hypodermic needle, said instrument comprising an elongated hollow body forming the handle of said instrument, a hollow foot angularly connected to one end of said hollow body and in communication therewith, said foot having a pair of opposed openings in its upper and lower walls, a self-sealing cover disposed upon the upper wall of said foot over and adjacent to the opening in said wall to form a seal therefor, and means secured to the opposite end of the hollow body for creating negative atmospheric pressure within its interior and the interior of said foot, when the opening in the lower wall of said foot is placed upon the tissue selected as the point for injection of said hypodermic needle and which acts as a seal therefor and thereby permitting the creation of a partial vacuum within said hollow body and foot causing said tissue to be drawn inwardly and held taut and immovable therein.

References Cited in the file of this patent

UNITED STATES PATENTS

| | | |
|---|---|---|
| 722,019 | Hildebrandt et al. | Mar. 3, 1903 |
| 1,138,881 | McFarland | May 11, 1915 |
| 1,148,093 | Kells | July 27, 1915 |
| 1,910,935 | Smith | May 23, 1933 |
| 1,934,046 | Demarchi | Nov. 7, 1933 |
| 2,597,966 | Adler | May 28, 1952 |
| 2,743,723 | Hein | May 1, 1956 |